May 4, 1937.　　　A. G. THOMAS　　　2,079,365
FILTER
Filed March 25, 1936

Albert G. Thomas, Inventor

By

Attorney

Patented May 4, 1937

2,079,365

UNITED STATES PATENT OFFICE 2,079,365

FILTER

Albert G. Thomas, Lynchburg, Va.

Application March 25, 1936, Serial No. 70,734

7 Claims. (Cl. 210—179)

This invention relates to filters and is a continuation of my pending application, Serial No. 61,483, filed Jan. 30, 1936. While these filters are primarily designed for use with internal combustion engines such as those used in automobiles and airplanes, they can also be used for filtering water or other liquids.

An object is to provide a filter that will remove harmful solid particles from the entire circulating oil supply in an internal combustion engine, rather than from a fraction of the circulating oil as at present.

Another object is the provision of a filter that will clean 100% of the oil but which will not clog and thus endanger the oil supply to various parts of the engine. With most filters in use at present, a by-pass valve is used to divert the major portion of the circulating oil, especially after sediment accumulates on the filter surfaces, so that only a small portion of the oil is actually subjected to filtering action at any one time. In the meantime, particles of grit and other harmful abrasives are circulated throughout the engine bearing surfaces. With my construction, however, all the oil can be filtered and yet danger of stoppage or lessening of the oil supply is obviated.

Another object is to furnish a filter with an indicator to show when the filter elements need renewing. Other objects will appear in the following description.

Figure 1:
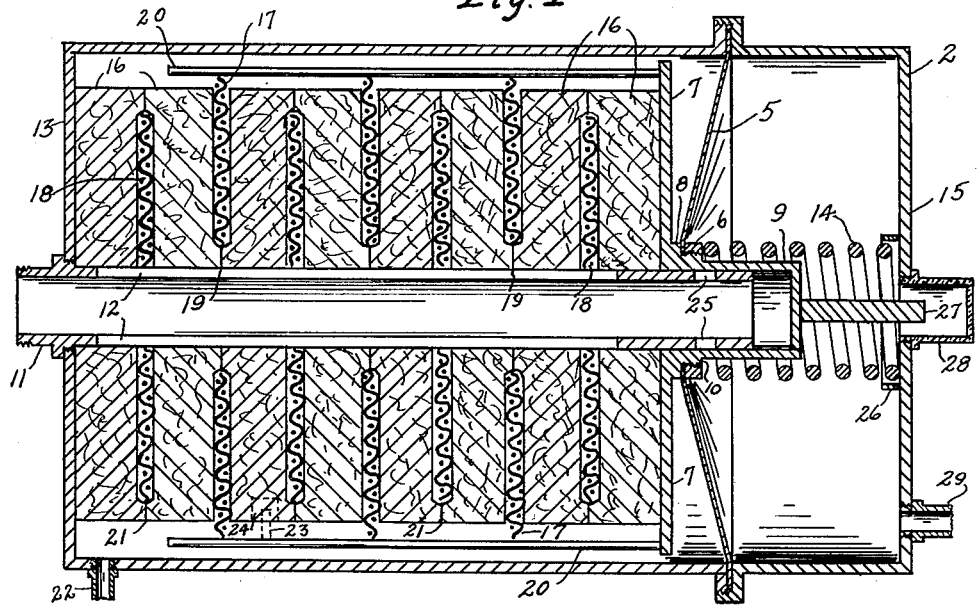
Figure 1 is an axial sectional view of a cylindrical type of filter with flexible diaphragm.

In Figure 1 cylindrical casing 1 has threaded cup 2 screwed onto it as shown, the circular flanges 3 and 4 clamping the peripheral edge of flexible diaphragm 5 which may be made of thin metal, artificial rubber, or treated fabric. A hole is cut in the center of diaphragm 5 so that it can be slipped over sleeve 9 and will strike against shoulder 8 of circular plate 7 which is integral with sleeve 9. Threads 10 on sleeve 9 receive nut 6 which is screwed up to clamp diaphragm 5 between the nut and shoulder 8. Therefore, since sleeve 9 is closed at the end and since diaphragm 5 is clamped tightly, both at the center and around the outer edge, there will be no leakage of oil from the interior of casing 1 into cup 2.

Central drain tube 11 is screwed into end plate 13 of casing 1 and is provided with slots 12 through which filtered oil may enter the tube. Tube 11 is rigidly supported on plate 13, and plate 7 and tube 9 are axially slidable on the free end portion of tube 11. Compression spring 14 presses against nut 6 and against end plate 15 of cup 2 so that plate 7 is normally urged to the left to compress filtering material 16 which is cut into the form of discs with central holes fittingly snugly over drain tube 11. Wire screening elements 17 are cut into the form of large washers of larger diameter than discs 16 and with central holes larger than the diameter of tube 11 so that filtering material 16 will be pressed together at annular surfaces 19 so that oil from casing 1 must pass through filtering material 16 at some point before it can enter slots 12. Guide rods 20 are fastened to plate 7 and serve to align discs or washers 17 with reference to drain tube 11. Smaller washers or discs 18 of wire screening fit closely but slidably over tube 11, but their outer diameters are less than the diameters of discs 16 so that the filtering material will be pressed together at annular surfaces 21 with the result that oil cannot flow directly from the interior of casing 1, down wire screen washers 18 and to drain slots 12, without first passing through filtering material 16 at some point. The end discs 16 will prevent direct leakage of oil into slots 12 at those points.

Filtering material 16 may be of cotton fabric, flannel, wool, felt or of finely ground cork encased in coarse cloth. It should be of such a weave or construction that it will possess a certain springiness or elasticity. In this way the mesh of the filtering material will be made fine when it is compressed and it will be relatively coarse when the pressure is reduced or eliminated.

The mesh and thickness of wires forming screen washers 17 and 18 may be varied within wide limits, but it is preferable to have them sufficiently thick and of relatively close mesh to prevent the filtering material 16 from being forced through the screening. The filter would still operate were this to occur but the effective filtering area might be reduced since the annular surfaces 19 would have a tendency to open under too much pressure. It is obvious that with the construction shown the effective filtering area is very large for the space occupied by the filtering elements. Separating screens 17 and 18 should be sufficiently thick to provide space for accumulation of sediment. Several washers may be used to attain the required space. While the washers 17 and 18 are shown as being constructed of screening, they may also be made of perforated discs of metal or fibre, with radial grooves pressed into them for oil channels. Likewise, whether made of screening or perforated plates, they may be somewhat dished to provide a spring action to separate washers 16 when pressure from plate 7 is removed or lessened. Another method of accomplishing this result would be to have a number of arms 23, shown dotted, fastened to rods 20 and placed in slots 24, cut into washers 16 so that these washers will be separated when plate 7 is moved to the right. The width of slots 24 could be varied to cause varying alignment of washers 16. The arms 23 may also be made to press against screens 17.

In the operation of the filter, oil is admitted under pressure through pipe 22 and fills the space enclosed by end wall 13, cylindrical wall 1, and diaphragm 5. The oil is then forced along the coarse screen channels 17, through filtering material 16, and out channels 18 to drain slots 12 and so out of drain tube 11 to parts of the engine to be lubricated. Should an excessive back pressure be built up in the filter due to accumulation of sediment in or on the filtering elements 16, the pressure of the oil will push diaphragm 5 and therefore plate 7 to the right, against compression spring 14, so that the pressure of spring 14 forcing elements 16 together will be reduced in proportion to the back pressure built up in the filter. Therefore, the more sediment that accumulates in or on the filter surfaces the less will be the spring pressure on the filtering elements 16 so that the porosity of these elements will be more or less automatically regulated according to the condition of the filter. In other words as the pores of the filtering material become clogged with sediment taken out of the oil, the effective spring pressure is reduced so that the natural expansiveness of the material will enlarge the pores to compensate for the sediment.

In case, after long use, the filter pores should become badly clogged, the oil will be forced between annular surfaces 21 and also between surfaces 19 and so into drain pipe 11 but there would still be a certain filtering action as the oil would be scrubbed in passing between these surfaces. Holes 25 may be provided in tube 11 so that in extreme cases such as the filtering elements sticking together or something similar, the plate 7 will, in the event of very high back pressure, uncover holes 25 so that oil will pass directly into tube 11. Such an extreme condition would however rarely occur. It will be seen then that the entire oil supply of an engine may be passed through this filter with no possibility of stoppage of the flow.

Another nut similar to nut 6 may be screwed upon the threaded portion of sleeve 9 and may be used to adjust the compression of spring 14. In ordinary practice the strength of spring 14 will be determined by the area of and design of diaphragm 5 in conjunction with the back pressure to be compensated for in the filter. Rod 27 is fastened to sleeve 9 and projects into transparent tube 28. When plate 7 is forced to the right, tube 28 is screwed into plate 15. The position of the end of rod 27 will then be an indication of the amount of pressure compensation taking place in the filter. It will also indicate the condition of filtering washers 16. Rod 27 may be linked to a pivoted indicator if it is desired to magnify the readings. A scale may of course be used in conjunction with it. Annular ring 26 may be provided to guide spring 14. To carry oil back to the crankcase in case diaphragm 5 should break pipe 29 is provided and at the same time it supplies an air outlet. A check valve could of course be placed in pipe 29 to allow air to pass but to close if oil should come through. An air outlet is not essential however since, if pipe 29 were closed, the compressed air in cup 2, when diaphragm 5 is forced to the right, would act in effect to lessen the strength of spring 14 required; or a partial vacuum in cup 2 could be employed.

It is obvious that diaphragm 5 could be replaced by a piston working in cup 2 as a cylinder but the diaphragm construction is more practicable.

All the separating washers of screening may fit tube 11 closely, like washers 18, and may extend beyond washers 16 as shown by washers 17 but in this case slots 12 would be eliminated and drain holes would be placed in tube 11 midway between the faces of washers 16. This construction requires that washers 16 be kept properly aligned, else the washers of screening may be moved until they fit directly over a drain hole, in which case, oil would be discharged directly into tube 11. The construction as shown is preferable.

Figure 2:
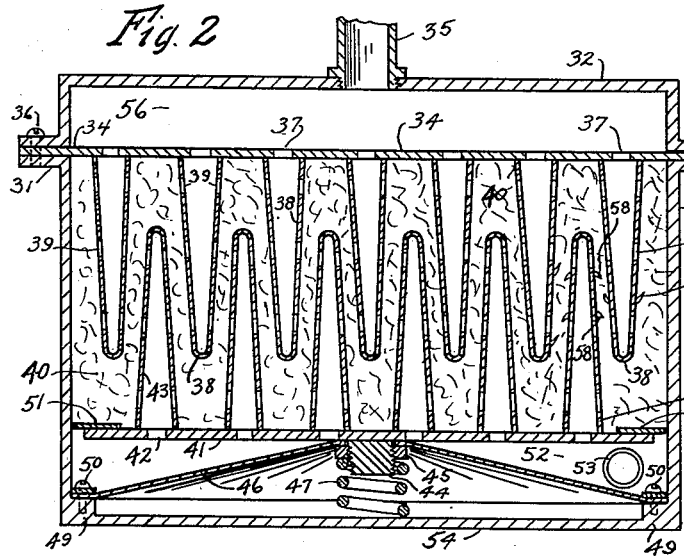
Figure 2 is a mid-sectional elevation of a rectangular type of filter with flexible diaphragm.
Figure 3:
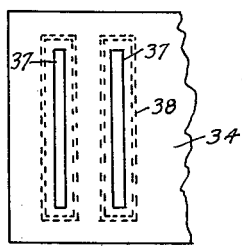
Figure 3 is a fragmentary interior plan view of the construction shown in Figure 2.

In Figure 2, rectangular box-like casing 30 has flange 31 extending around the top edge and rectangularly shaped cover 32 having flange 33 is clamped to flange 31, the edges of rectangular plate 34 being clamped between the flanges in liquid tight manner by means of a series of bolts or screws 36. Drain pipe 35 is screwed into a hole in cover 32. Slots 37 are provided in plate 34 as shown in Figure 3. Fastened to plate 34 beneath these slots are hollow wedge shaped liquid drain conduits 38 which have a series of holes or slots 39 through which the liquid from filtering material 40 may pass into conduits 38. These wedge shaped conduits may be welded to plate 34 or may be drawn out of this plate or otherwise made. They may also be made of screening or they may be cast of metal or other material along with plate 34. They may also be moulded out of plastics.

Similarly, rectangular plate 41 has oil entrance slots 42 and wedge shaped oil conduits 43 attached. Fastened to plate 41 is threaded post 44, upon which is screwed nut 45 to clamp diaphragm or membrane 46 between the nut and plate 41, a suitable hole being provided in this diaphragm. The entire peripheral edge of diaphragm 46, which in this case may be of rectangular shape, is clamped between strips 48 and rectangular plane surfaces 49 of casing 30. A number of screws 50 serve to tighten the strips down to prevent oil from leaking into the space beneath the diaphragm. Flexible strips 51 are fastened to plate 41 to prevent filtering material 40 from falling into the oil inlet space 52 which is filled with oil from inlet pipe 53. Compression spring 47 pressing against bottom 54 of casing 30 and against nut 45, normally urges plate 41 in an upward direction so that filtering material 40 is normally compressed between the plurality of wedges 38 and 43.

In operation, oil from inlet pipe 53 will fill space 52 and will flow through slots 42 and into conduits 43. The oil will then flow out of holes or slots 55 in conduits 43 and through filtering material 40, leaving foreign matter trapped in this material, and thence through holes 39 into conduits 38 and so on out of holes 37 into chamber 56 from which drain pipe 35 will carry it to parts of the engine.

The wedge shaped conduits 38 and 43 which are preferably closed at the ends, serve a double purpose in that they greatly increase the effective filtering area; being interleaved as they are, and at the same time they compress the filtering material to reduce the porosity. The pores may be very fine for a certain period before much sediment accumulates in the material 40. Then as sediment accumulates and the oil meets with increased resistance to flow, the back pressure will act upon diaphragm 46 and so will lower wedges 43 to reduce the pressure on material 40 with the result that the pores will enlarge and oil will flow normally again. Hooks 57 and 58 may be fastened to wedges 38 and 43 respectively so that filtering material 40 is forcibly loosened or pulled apart when diaphragm 46 is pressed down. Likewise dished perforated spring discs may be distributed throughout the filtering material to separate it when pressure is reduced.

Filtering material 40 may consist of packed cotton, flannel, ground cork, rock fibre, glass wool, felt or wool. It is preferable for it to have elasticity so that the spaces separating the various fibres will enlarge when the compressing force is lessened. While material 40 is shown as being loosely packed it may be in the form of a continuous strip of material threaded back and forth between the various wedges.

The wedge shaped conduits 38 may be in the form of a continuous spiral and similarly, wedges 43 may be in spiral shape and arranged so that the spirals may be pressed together, the lower spiral wedge fitting into the spaces between the upper spiral wedge or vice versa. Likewise these conduits may be formed as interleaved concentric circles or in any shape desired.

It is obvious also that wedges 38 and 43 may be eliminated entirely if desired so that the oil would flow from perforated plate 41, through the filtering material and thence through perforated plate 34. If desired, the wedges could be replaced by strips carrying hooks similar to hooks 57 and 58.

Figure 4:
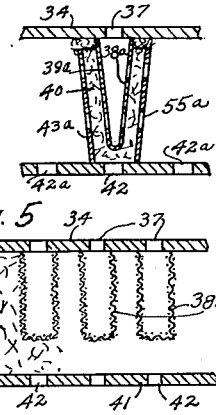
Figure 4 is a fragmentary sectional elevation of an alternative construction of filtering elements.

As shown in Figure 4 the filtering material 40 may be compressed between a plurality of perforated cones 38a attached to plate 34 and a plurality of surrounding perforated truncated cones 43a. Holes 39a and 55a are shown. Oil will flow through holes 42a to surround the cones and will flow then through holes 55a, through the material 40 and so through holes 39a.

Figure 5:
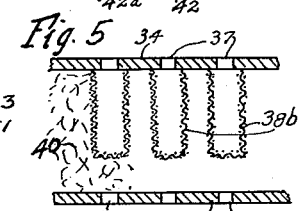
Figure 5 is a fragmentary sectional elevation of still another filtering element construction.

In Figure 5 drain plate 34 is provided with holes 37 under which are fastened cylindrical cups 38b of screening. These cups may be covered with cloth, or filtering material 40 may be packed around them.

This construction may be used with or without the diaphragm as shown in Figure 2. It is understood that plates 34 and 41 of Figures 4 and 5 are to be used similarly to plates 34 and 41 of Figure 2. In case filtering cylinders 38b are used without material 40, perforated plate 41 may be, of course, eliminated.

It will be readily apparent that many changes of detail may be made without departing from the general principles underlying my oil filters. For instance the compression of the filtering elements may be relieved by a pressure operated device outside of the filter casing, which device may be placed at any suitable position in the oil line. I am aware that innumerable similar changes are possible but it is impracticable to point them out here.

What I claim is:

1. In a filter, a casing, an inlet and an outlet for liquids in said casing, a perforated tube fastened in said casing, discs of filtering material with central holes being supported by said tube, said discs being separated one from the other by washers of wire screening, said washers being alternately of greater and lesser diameter respectively than the diameters of said discs, yielding means for pressing said discs and said washers together, and means operable by pressure of said liquid being filtered to reduce the effective force pressing said washers and said discs together when said pressure exceeds a certain amount.

2. In a filter, a casing, an inlet and an outlet for liquid in said casing, filtering means disposed within said casing, yielding means compressing said filtering means, a diaphragm acting upon said yielding means and operated by pressure of said liquid to reduce the compression of said filtering means in inverse relation to the pressure of said liquid, a perforated plate forming a separate chamber in said casing, wedge-shaped perforated liquid conduits fastened to said perforated plate and surrounding said plate perforations, oppositely disposed staggered perforated wedge-shaped liquid conduits fastened to a second plate over perforations in said second plate, said filtering means being placed between said oppositely disposed wedge-shaped conduits.

3. In a filter, a casing, an inlet and an outlet for liquid in said casing, filtering means disposed within said casing, yielding means compressing said filtering means, and a diaphragm acting upon said yielding means and operated by pressure of said liquid to reduce the compression of said filtering means in inverse relation to the pressure of said liquid, said filtering means being disposed between liquid collecting means and liquid supplying means, and projecting means movable by displacement of said diaphragm to prevent clogging of said filtering means with sediment.

4. In a filter, a casing, an inlet and an outlet for liquid in said casing, filtering means disposed within said casing, means for compressing said filtering means, a flexible diaphragm for varying the pressure of said compression means, and a drain opening in said casing on the side of said diaphragm opposite to said filtering means.

5. In a filter, a casing, an inlet and an outlet for liquid in said casing, a perforated drain tube within said casing, filtering elements supported upon said drain tube, means for compressing said filtering elements, liquid-conducting separators placed between said elements, and a diaphragm operated by pressure within said casing, to reduce the pressure of said compressing means forcing said filtering elements and said separators together.

6. In a filter, a casing, an inlet and an outlet for liquid in said casing, filtering means disposed within said casing, yielding means compressing said filtering means, and a diaphragm acting upon said yielding means and operated by pressure of said liquid to reduce the compression of said filtering means in inverse relation to the pressure of said liquid.

7. In a filter, a casing, an inlet and an outlet for liquid in said casing, a perforated drain tube mounted within said casing; porous, resilient, compressible filtering pads with holes, supported on said drain tube, liquid conducting elements placed between said pads, an end compression plate slidable on said drain tube to compress said filtering pads, a spring pressing against said plate, a diaphragm forming a liquid tight wall within said casing and acting on said plate so that increasing pressure of said liquid will reduce the effective pressure of said plate on said filtering pads, so that the pores of said porous, resilient, compressible filtering pads will be enlarged to pass more liquid when the pressure of said liquid in said casing exceeds a predetermined amount.

ALBERT G. THOMAS.